United States Patent [19]
Ishikawa et al.

[11] 3,758,129
[45] Sept. 11, 1973

[54] SUSPENSION SYSTEM FOR VEHICLES

[75] Inventors: Masakazu Ishikawa; Jyuichi Shibatani; Masanao Shiomi, all of Aichiken, Japan

[73] Assignee: Toyota Jidosha Kabushiki Kaisha, Toyota-shi, Aichi-ken, Japan

[22] Filed: Feb. 3, 1971

[21] Appl. No.: 112,236

[30] Foreign Application Priority Data
Feb. 18, 1970  Japan.................. 45/13427

[52] U.S. Cl.............. 280/96.1, 180/43 R, 188/18 A
[51] Int. Cl........................... B62d 7/14, B62d 7/18
[58] Field of Search................. 280/93, 96.1, 96.2, 280/96.3; 180/43 R, 43 A; 188/18

[56] References Cited
UNITED STATES PATENTS

| 2,967,066 | 1/1961 | Mueller...................... 280/96.2 RX |
| 3,295,636 | 1/1967 | Adams.............................. 188/18 R |
| 3,136,565 | 6/1964 | Bischoff et al................. 280/96.2 R |
| 2,780,477 | 2/1957 | Schjolin......................... 280/96.2 R |
| 2,952,144 | 9/1960 | Holmes, Jr..................... 280/96.2 B |

FOREIGN PATENTS OR APPLICATIONS

| 340,142 | 9/1959 | Switzerland................... 280/96.2 R |
| 1,073,362 | 8/1952 | France............................ 180/18 A |

Primary Examiner—Kenneth H. Betts
Assistant Examiner—John P. Silverstrim
Attorney—John J. McGlew and Alfred E. Page

[57] ABSTRACT

In a ball-joint type front-wheel suspension system, a disc wheel is supported in a vertically oscillatable manner by a knuckle and a spindle connected to the vehicle body. A brake supporting plate is secured to a flange of the spindle, or to the mounting portion of the knuckle in the case of a front wheel drive. A caliper of a disc brake is formed integrally with the brake supporting plate at one side thereof. A lower mounting seat is formed integrally with the brake supporting plate at the other side thereof. By way of the lower mounting seat and a ball joint or a joint pin, a lower arm is installed so that steering of the wheel is possible.

4 Claims, 8 Drawing Figures

SUSPENSION SYSTEM FOR VEHICLES

BACKGROUND OF THE INVENTION

This invention relates to a suspension system for vehicles which is provided with a knee action by means of a parallel linkage, and more particularly to a front wheel suspension system wherein a parallel linkage, i.e., upper and lower arms, is connected to a knuckle through ball joints.

In the conventional suspension system of the type described, a knuckle, constituting one side of a parallel linkage, is provided at the upper and lower ends thereof with ball joint mounting seats which serve as linkage joints. Moreover, the knuckle is provided with a spindle for supporting a disc wheel at a position near the lower end thereof. The mounting seats and spindle are formed as one body, or a lower mounting seat only is manufactured separately and is bolted to the knuckle. In the system wherein upper and lower joint mounting seats are integrally formed, the shape of the knuckle becomes complicated, thus making manufacture of knuckles difficult. In the system wherein the lower mounting seat is manufactured separately, the number of parts required is increased accordingly. In any case, the manufacturing cost of the suspension system becomes high.

Particularly, integral type knuckles manufactured for a specific type of vehicle cannot be used for other types of vehicles, which is quite inconvenient from the standpoint of stock control. Moreover, in the case of front wheel drive suspensions, a lower mounting seat must be installed across the driving shaft at the lower portion thereof. Therefore, such a lower mounting seat leaves much to be desired because of a limited mounting space or mechanical strength, thus resulting in an increase in the number of man-hours for assembly or in material cost.

SUMMARY OF THE INVENTION

An object of this invention is to provide a suspension system whose parts can be easily manufactured and which can be easily assembled, thereby reducing the manufacturing cost without sacrificing the mechanical strength. Another object of this invention is to provide a suspension system which can be easily assembled and facilitating the manufacture of a knuckle, by integrally forming a lower ball joint mounting seat with a brake actuator carrying member, especially, a disc brake supporting plate, to be bolted to the flange of the knuckle.

In ball-joint type suspension systems, the suspension system for vehicles according to this invention comprises a knuckle having an upper mounting seat, a spindle and a flange located at the rear portion of the spindle, a brake actuator supporting plate bolted to the flange and having a lower mounting seat as one body at the lower end thereof, an upper arm connected to the upper mounting seat through a ball joint, and a lower arm connected to the lower mounting seat through a ball joint.

DESCRIPTION OF THE PREFERRED EMBODIMENTS

Figure 1:
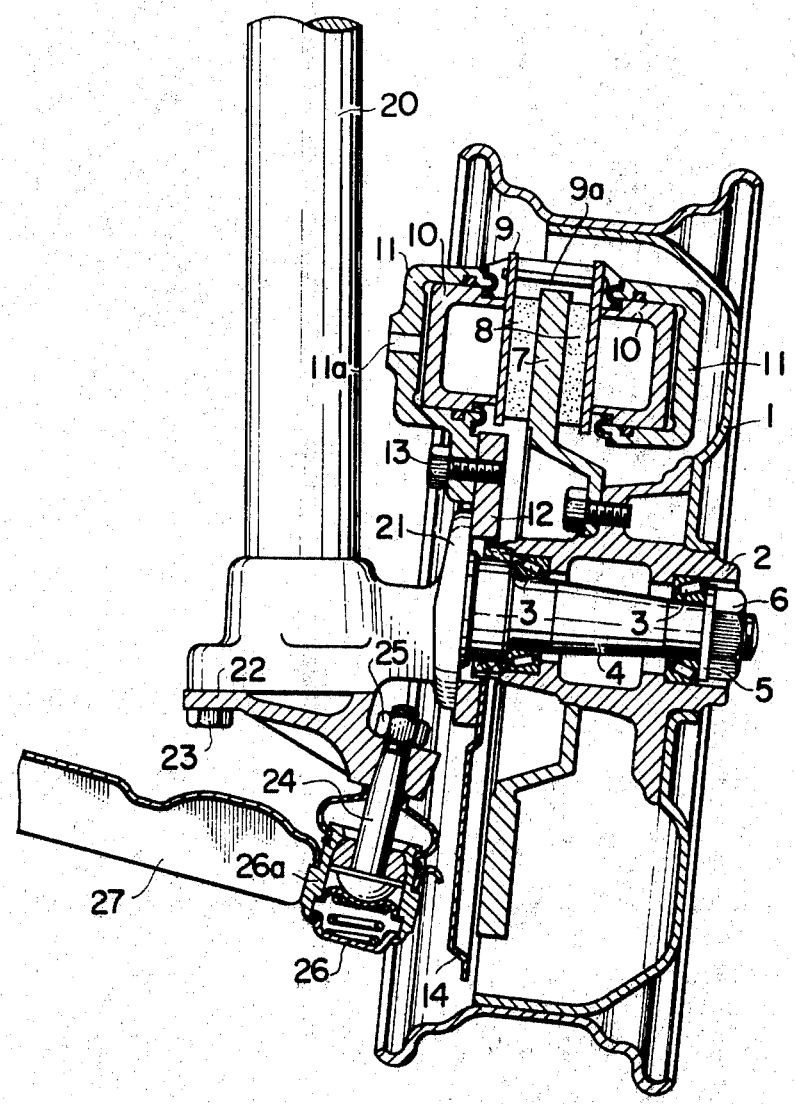
FIG. 1 is a cross sectional view of a conventional suspension system.

Illustrated in FIG. 1 is a conventional suspension system. The reference numeral 1 identifies a disc wheel, on the outer periphery of which a tire (not shown) is mounted. A hub 2, supporting wheel 1, is rotatably supported by bearings 3 on a spindle 4 which is integral with a knuckle described hereinafter. The hub 2 is rotatably supported on the spindle 4 by means of the bearings 3, and is prevented from coming out in the axial direction by means of a washer 5 and a nut 6. The reference numeral 7 identifies a brake disc bolted to the hub 2. A disc brake is formed by brake disc 7, pads 8 located near the both surfaces of the brake disc, shoes 9 supporting the pads, a piston 10 and a caliper 11. The piston 10 presses the pads 8 against the disc 7 when pressure oil is supplied through an oil hole 11a in the caliper 11, thus developing braking force. The reference numeral 9a identifies a guide pin for the shoe 9.

The reference numeral 12 designates a brake supporting plate, to which the caliper 11 is secured by a bolt 13. The brake supporting plate 12 is in contact with a flange 21 formed at the rear end of the spindle 4 and is secured thereto by bolts in a plurality of places which are not shown in FIG. 1. The reference numeral 14 designates a brake cover. The reference numeral 20 identifies a knuckle having spindle 4 and flange 21 as one body at the lower end thereof. A lower mounting seat 22 is secured to knuckle 20 by a bolt 23. An upper mounting seat is provided at the top of the knuckle 20, which is not illustrated. A joint pin 24 is attached to the lower mounting seat 22 by a nut 25. A ball joint 26 of known construction is installed at the head of the pin 24. A case 26a of the ball joint 26 is installed at the tip of a lower arm 27.

The cross member of the vehicle body and another wheel, which are not illustrated, are respectively supported in a vertically oscillatable manner by means of a parallel linkage consisting of the knuckle 20, the lower arm 27 and the upper arm. At the same time, steering is made possible by means of the ball joint 26 or the like.

As is apparent from FIG. 1, in the conventional systems, the lower mounting seat 22 is constructed separately and is connected to the lower end of the knuckle 20, or is else constructed integrally with the knuckle 20. In this case, the manufacturing cost increases due to the increase in the number of parts required or complication of the shape of the knuckle. Moreover, a difficulty is experienced in assembly operations due to the limited space around the bolts 23 or 25.

Figure 2A:
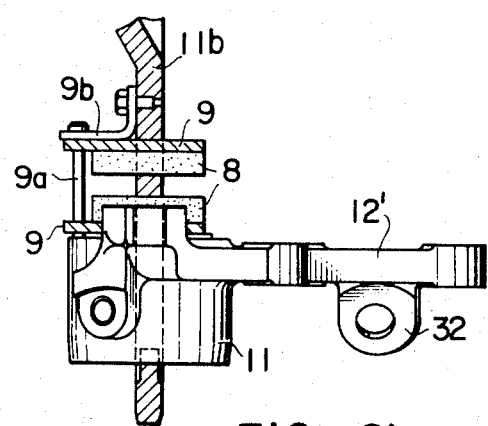
FIGS. 2a and 2b are a plan view and a partial side view, respectively, illustrating the construction of a brake supporting plate used in the suspension system according to this invention.
Figure 2B:
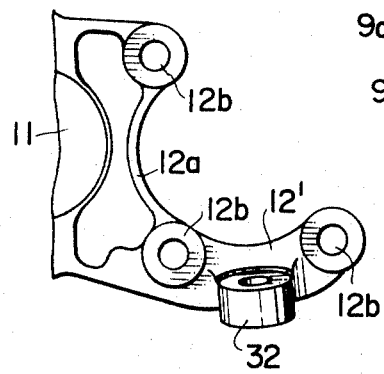

In order to eliminate the above-described shortcomings, the system of this invention is constructed as shown in FIGS. 2a and 2b, so that a lower mounting seat 32 is formed integrally with the brake actuator supporting plate or member 12′. In this embodiment, the caliper 11 is also constructed integrally with the brake supporting plate 12'. The brake is constructed so that the pad 8 and the shoe 9 at one side are operated by means of a hydraulic piston and that the pad 8 and the shoe 9 at the other side are supported by means of an interlocking plate 11b and a fixture 9b. The reference numeral 9a designates a guide pin. As is seen from FIG. 2b, the brake supporting member 12' has a planar portion with an edge formed with U-shaped opening or arcuate recess 12a, for embracing the spindle, and with bolt holes 12b for installing plate 12' on the flange 21.

Figure 3A:
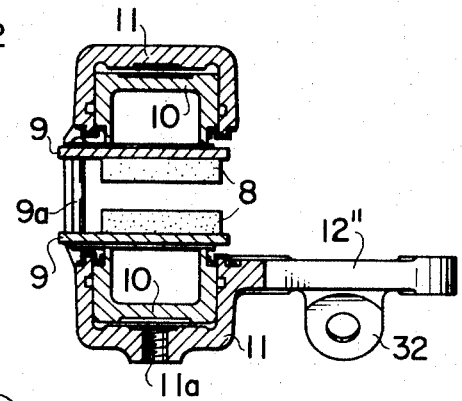
FIGS. 3a and 3b are, respectively, a cross sectional view of another embodiment of the brake supporting plate taken along the line IIIa—IIIa of FIG. 3b and a partial side view thereof.
Figure 3B:
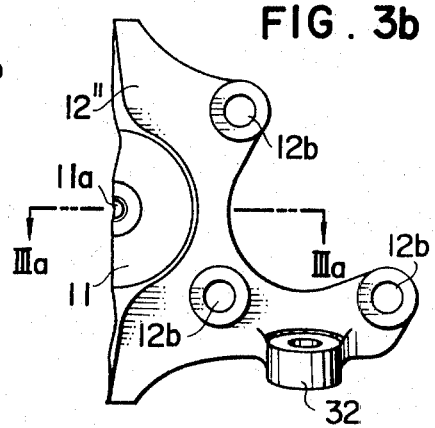
Figure 4:
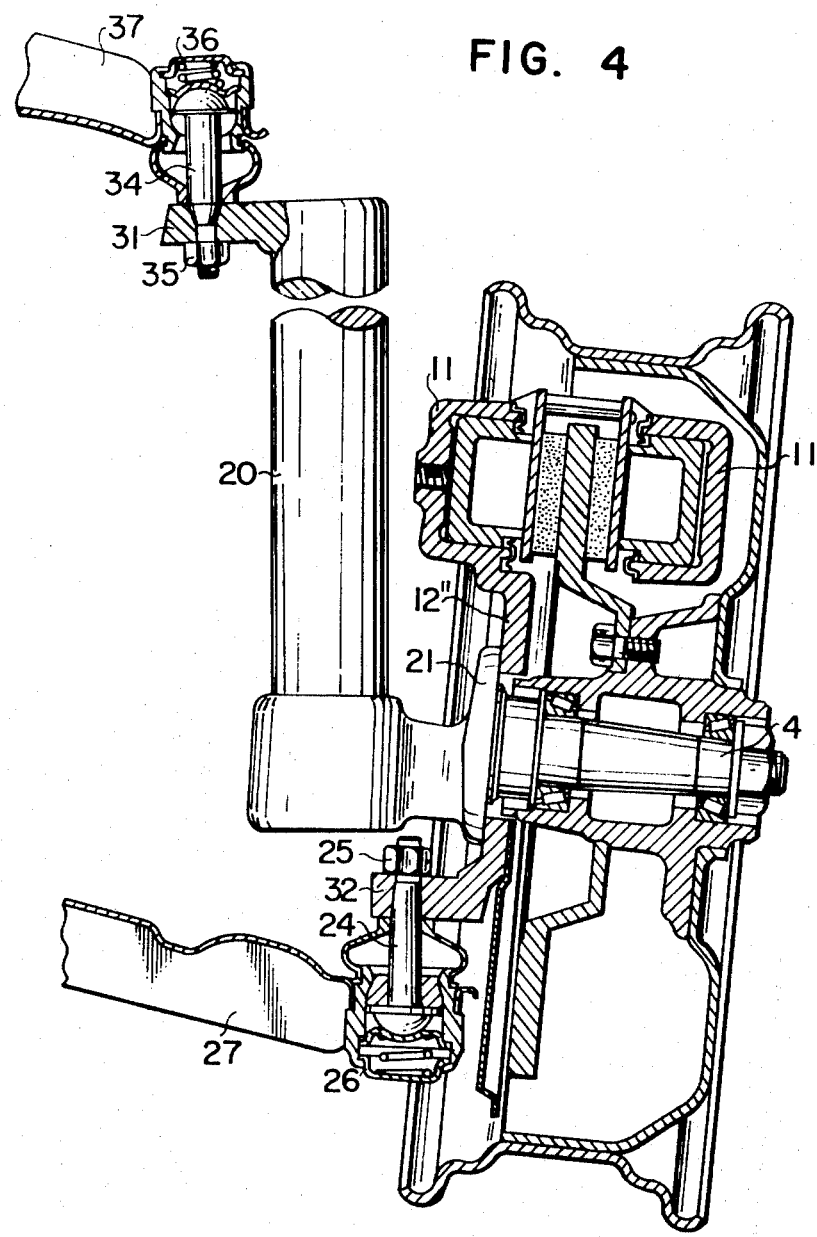
FIG. 4 is a cross sectional view of the suspension system according to this invention.

In FIGS. 3a and 3b, a pair of calipers 11 are formed integrally with the brake actuator supporting plate 12'' having the lower mounting seat 32 as one body therewith. A suspension system having the brake supporting plate 12'' of the above-described construction is shown in FIG. 4. The joint pin 24 and the ball joint 26 are installed on the lower mounting seat 32. In FIG. 4, an upper mounting seat 31 located at the top of the knuckle 20 is shown, to which a joint pin 34 is secured by a nut 35 and an upper arm 37 is connected through a ball joint 36.

The shape of the knuckle 20 can be simplified by forming the lower mounting seat 32 and the brake actuator supporting plate as one body, thus making manufacture of the knuckle 20 easier. In assembling them, one end of the joint pin 24 is secured by tightening the nut 25 to the lower mounting seat 32 formed as one body with the brake actuator supporting plate. Then, the opening 12a of the supporting plate is inserted around the spindle 4 from the side, thus bringing the planar portion of the supporting plate into contact with the flange 21. At this time, the tightening operation for securing the supporting plate to the flange 21 can be easily accomplished.

Figure 5:
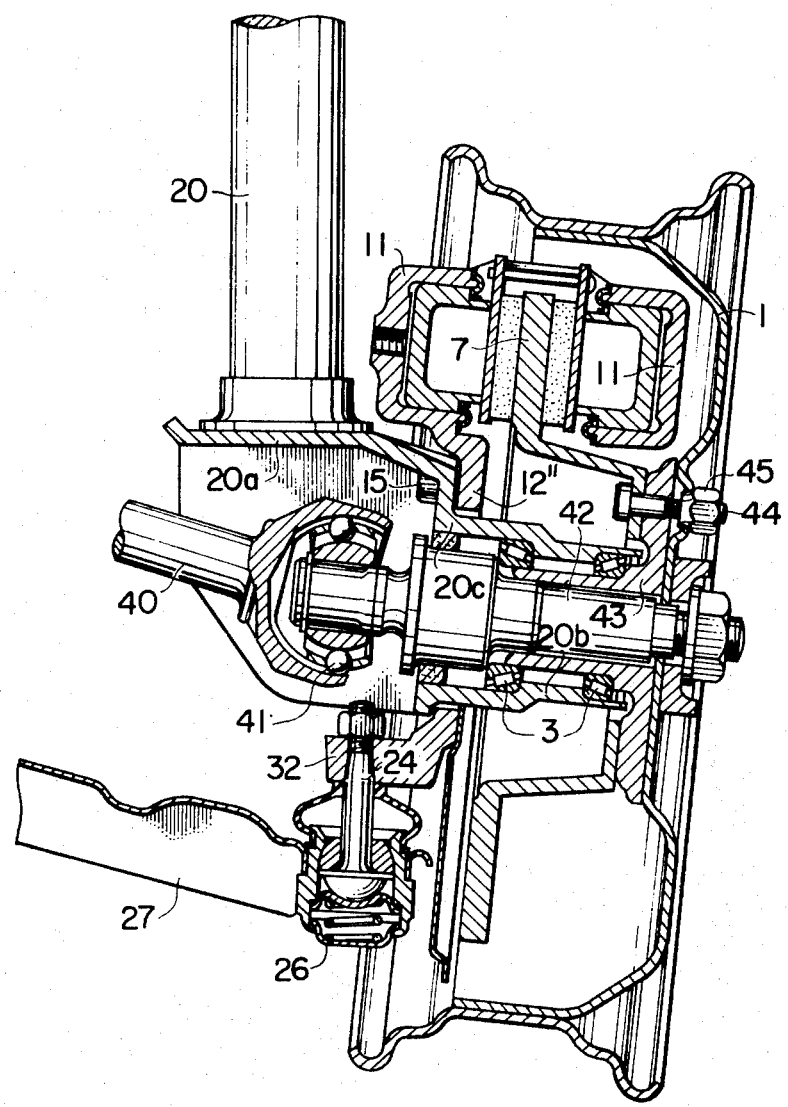
FIG. 5 is a cross sectional view of an embodiment of this invention in the case of a front wheel drive.

Illustrated in FIG. 5 is a suspension system having a front wheel drive construction. The knuckle 20 has at the lower end thereof a mounting portion 20a made of steel plate, a hollow spindle 20b and a flange portion 20c. The reference numeral 40 identifies a driving shaft, by means of which a shaft 42 is rotated through a ball-type universal joint 41. A hub 43 is inserted into the shaft 42 and is rotatably supported by the hollow spindle 20b through the bearings 3. The disc wheel 1 and the brake disc 7 are secured to the hub 43 by means of bolts 44 and nuts 45.

The brake supporting plate 12'' having the lower mounting seat 32 as one body is secured to the flange portion 20c of the knuckle 20 by means of the bolt 15. The joint pin 24 is attached to the mounting seat 32. By virtue of the construction of this invention, assembling of the lower arm 27 and the joint 26 can be accomplished in the same manner as shown in FIG. 4 even in a system wherein the driving shaft 40 of the above-described construction is inserted under the lower end of the knuckle 20. Since the lower mounting seat 32 is not provided at the side of the knuckle 20, the construction of the mounting portion 20a is not complicated and excessively high strength is not required.

Figure 6:
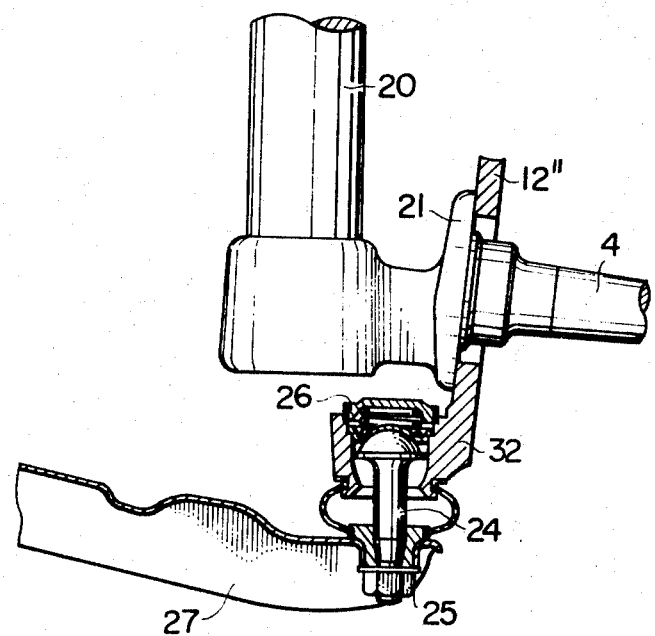
FIG. 6 is a partial cross sectional view of another embodiment of the system according to this invention.

In the embodiments described above, the one end of the joint pin 24 is fixed to the lower mounting seat 32. In addition to this construction, it is possible to use the mounting seat 32 as a case of the ball joint 26 as shown in FIG. 6, wherein the end portion of the pin 24 is secured to the lower arm 27 by the nut 25.

According to this invention, the lower mounting seat 32 of the ball joint is formed integrally with the brake supporting plate 12' or 12'', and therefore the shape of the knuckle 20 can be simplified without increasing the number of parts required. Moreover, the assembly operation can be greately facilitated. Furthermore, the combination of knuckle 20 and the brake supporting plates of various sizes makes the system applicable to various kinds of vehicles, thereby making it possible to reduce the number of parts in storage. Thus, according to this invention, a suspension system can be provided at a decreased manufacturing cost.

What is claimed is

1. In a knee action wheel suspension systems for vehicles, of the type including vertically movable arm means secured at one end to the vehicle, a knuckle having an upper mounting seat means, ball joint means securing the upper mounting seat means to the arm means, a spindle extending from the knuckle, and a flange at the inner portion of the spindle, the improvement comprising a brake actuator carrying member having a planar portion juxtaposed and secured to said flange and having a lower mounting seat formed integrally therewith for securing to said arm means by second ball joint means; said planar portion having a generally U-shaped recess defining an opening on the periphery of said planar portion, whereby said planar portion may be slipped over said spindle to at least partially embrace the same with said U-shaped recess for juxtaposition and securing of said planar portion to said flange.

2. The improvement claimed in claim 1, in which said knuckle has a mounting portion constituting said flange, and said spindle is a tubular Spindle extending from said mounting portion; the planar portion of said brake actuator carrying member being secured to said mounting portion; and a wheel-driving spindle rotatably mounted in said tubular spindle.

3. The improvement claimed in claim 1, including a wheel rotatably mounted on said spindle; a brake disc, for a disc brake, secured to said wheel to rotate therewith; hydraulic pressure operated piston means on said brake actuator carrying member; and friction pad means interposed between said piston means and said brake disc.

4. The improvement claimed in claim 1, in which said brake actuator carrying member is bolted to said flange at three points.

* * * * *